United States Patent
Ko

[11] Patent Number: 6,144,856
[45] Date of Patent: Nov. 7, 2000

[54] RESERVED CHANNEL ALLOCATING METHOD IN MOBILE RADIO COMMUNICATION SYSTEM

[75] Inventor: You Chang Ko, Seoul, Rep. of Korea

[73] Assignee: LG Information & Communications, Ltd., Seoul, Rep. of Korea

[21] Appl. No.: 09/188,409

[22] Filed: Nov. 10, 1998

[30] Foreign Application Priority Data

Nov. 29, 1997 [KR] Rep. of Korea ............... 97-64790

[51] Int. Cl.[7] .................. H07Q 7/01; H04B 7/26
[52] U.S. Cl. .................. 455/436; 455/434; 455/439; 455/442; 455/450; 455/453
[58] Field of Search .................. 455/436, 434, 455/437, 438, 439, 440, 441, 442, 443, 450, 464, 453

[56] References Cited

U.S. PATENT DOCUMENTS

| | | | |
|---|---|---|---|
| 4,670,899 | 6/1987 | Brody et al. | 455/436 |
| 5,081,671 | 1/1992 | Raith et al. | 455/436 |
| 5,301,356 | 4/1994 | Bodin et al. | 455/436 |
| 5,530,912 | 6/1996 | Agrawal et al. | 455/436 |
| 5,884,174 | 3/1999 | Nagarajan et al. | 455/436 |

*Primary Examiner*—Lee Nguyen
*Assistant Examiner*—Simon Nguyen
*Attorney, Agent, or Firm*—Fleshner & Kim, LLP

[57] ABSTRACT

A reserved channel allocating method in a mobile radio communication system which can adaptively control the allocation of the number of reserved channels using a fuzzy logic controller in accordance with the fluctuant handoff traffic density. According to this method, the traffic density of handoff calls is identified for a period determined by a base station, and the ratio of the number of normal channels for processing initial calls and the handoff calls to the number of reserved channels for processing the handoff calls is adjusted in accordance with the traffic density of the handoff calls.

11 Claims, 7 Drawing Sheets

FIG.7

| IF CURRENT HANDOFF TRAFFIC DENSITY IS | AND LAST RESERVED CHANNEL IS | THEN LAST RESERVED CHANNEL IS TUNED TO |
|---|---|---|
| VL | VS | ALMOST ZERO(Az) |
| VL | S | NS |
| VL | M | NM |
| VL | B | NL |
| VL | VB | NVL |
| L | VS | PS |
| L | S | ALMOST ZERO(Az) |
| L | M | NS |
| L | B | NM |
| L | VB | NL |
| M | VS | PM |
| M | S | PS |
| M | M | ALMOST ZERO(Az) |
| M | B | NS |
| M | VB | NM |
| H | VS | PL |
| H | S | PM |
| H | M | PS |
| H | B | ALMOST ZERO(Az) |
| H | VB | NS |
| VH | VS | PVL |
| VH | S | PL |
| VH | M | PM |
| VH | B | PS |
| VH | VB | ALMOST ZERO(Az) | a → (row: L, M, NS)
b → (row: L, B, NM)
c → (row: M, M, ALMOST ZERO(Az))
d → (row: M, B, NS)

RESERVED CHANNEL ALLOCATING METHOD IN MOBILE RADIO COMMUNICATION SYSTEM

BACKGROUND OF THE INVENTION

1. Field of the Invention

The present invention relates to a mobile radio communication system, and more particularly to a reserved channel allocating method in a mobile radio communication system which can adaptively control the number of reserved channels in accordance with the fluctuant handoff traffic density rapidly changing in a specified geographic service area.

2. Description of the Related Art

Generally, a base station in a mobile radio communication system determines the number of normal channels and reserved channels by setting a plurality of traffic channel elements. Here, the normal channels are allocated for the process of initial calls and calls caused by handoff (hereinafter, referred to as handoff calls), and the reserved channels are allocated only for the process of the handoff calls only. Specifically, if a call is initiated from a certain mobile unit, it is processed through the normal channel. If a handoff call is initiated, it is first processed through the normal channel, but if all the normal channels are in use at that time, it is processed through the reserved channel. Generally, the number of normal channels is determined to be about 70% of the whole number of the channels, and the number of reserved channels is determined to be about 30% of the whole number of the channels. Here, the term "handoff" defines a function whereby if the mobile unit crosses the boundary between two geographic service areas, i.e., two cells, it is first allocated two channels from base stations of the two cells, and then if the intensity of the signal received from the previous base station becomes weak, it is automatically tuned to the channel of the current base station.

Since the mobile radio communication system provides such a handoff function, the number of calls attempted by mobile units, as the mobile units freely move across the boundaries among the cells, should have been greatly increased. Especially, during the time period for workers' going to work or going home from work, the traffic intensity caused by such handoffs in a particular downtown area may be greatly increased in comparison with other areas.

Specifically, in such downtown areas, a number of mobile units may be frequently allocated reserved channels from the corresponding base stations to process the handoff calls during almost the same time period.

However, since the number of normal channels and the number of reserved channels have already been set at a fixed rate, the normal channels for processing the initial calls may be changed to the reserved channels for processing the handoff calls in the area where a number of handoff calls are initiated during almost the same time period as described above, causing the telephone services not to be achieved. In other words, if the handoff call is initiated, it is first processed through the normal channel, but if all the normal channels are in use at that time, it is processed through the reserved channel.

For instance, if the number of initial calls is continuously increased in a state that about 20% of the whole channels are allocated for the initial calls and about 50% of the whole channels are allocated for the handoff calls in a particular service area, the telephone services cannot be provided with respect to any further initial call since the remaining 30% of the whole channels have already been allocated as the reserved channels and thus they are not available.

SUMMARY OF THE INVENTION

Accordingly, the present invention is directed to a reserved channel allocating method in a mobile radio communication system that substantially obviates one or more of the problems due to limitations and disadvantages of the related art.

An object of the present invention is to provide a reserved channel allocating method in a mobile radio communication system which can adaptively control the allocation of the number of reserved channels in accordance with the handoff traffic density which may be rapidly changed in a specified service area.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the reserved channel allocating method in a mobile radio communication system includes the steps of identifying the traffic density of handoff calls for a predetermined period, and adjusting the ratio of the number of normal channels to the number of reserved channels in accordance with the traffic density of the handoff calls.

In another aspect of the present invention, there is provided a reserved channel allocating method in a mobile radio communication system including the steps of sampling the number of handoff calls for a predetermined time interval, sampling the number of reserved channels allocated in a previous time period for said predetermined time interval, computing a control volume for the reserved channels using the sampled number, and adjusting the number of the reserved channels according to the control volume of the reserved channels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 7 is a view explaining the fuzzy rule base used by the fuzzy logic controller according to the present invention.

DETAILED DESCRIPTION OF THE PREFERRED EMBODIMENT

Reference will now be made in detail to the preferred embodiment of the present invention, examples of which are illustrated in the accompanying drawings.

Figure 1:
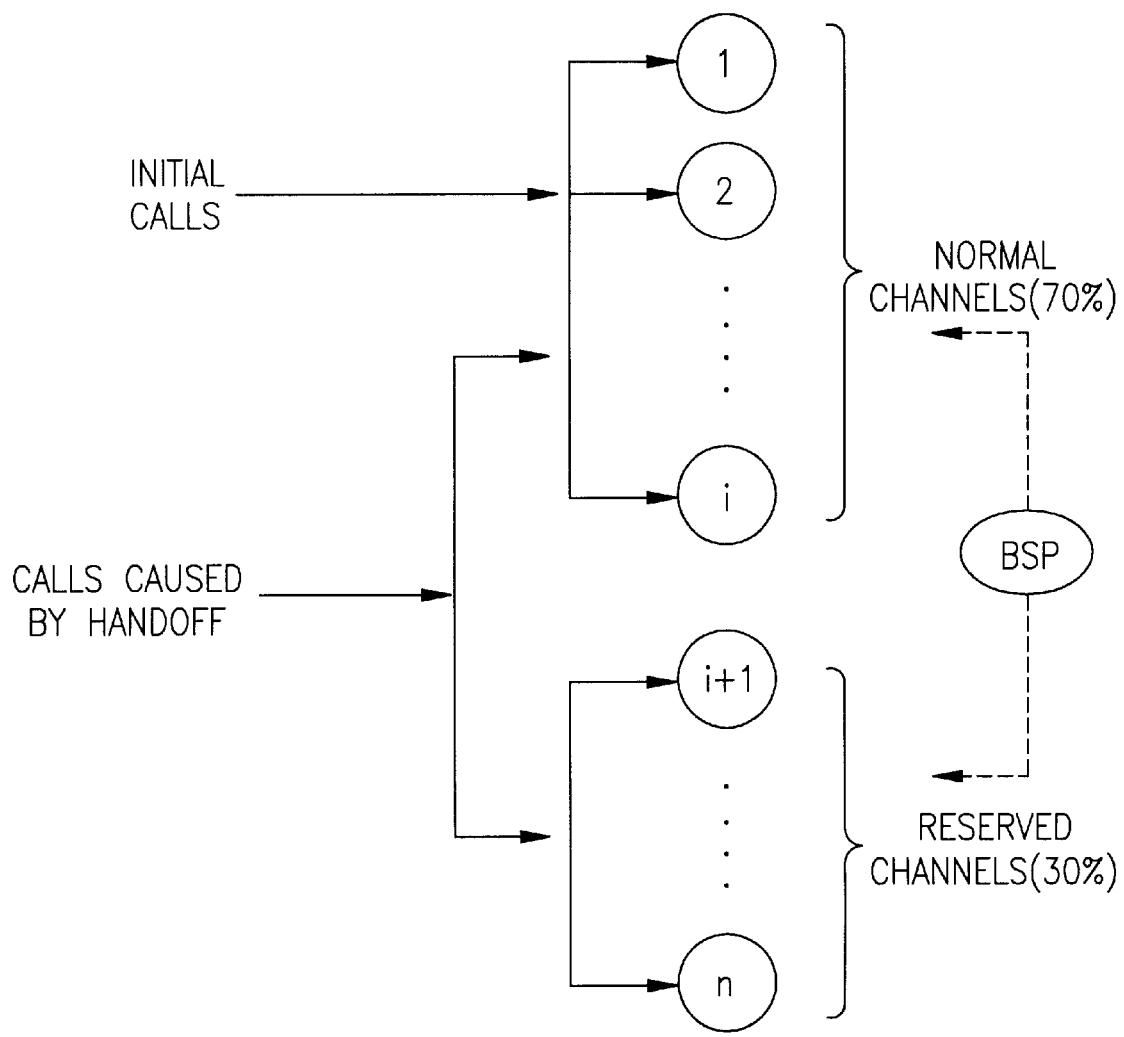
FIG. 1 is a view explaining a conventional method of determining reserved channels for handoff calls in a mobile radio communication system.

FIG. 1 is a view explaining a conventional method of determining reserved channels for handoff calls in a mobile radio communication system. Referring to FIG. 1, a base station signaling processor (BSP) fixedly sets about 30% of all available traffic channel elements (TCE) as reserved channels for handoff calls only, and processes the handoff calls through the reserved channels. Telephone services are provided through the normal channels 1, 2, . . . , i with respect to initial calls and the calls caused by the handoff. If all the normal channels are in use, telephone services are provided through the reserved channels fixedly set with respect to only the handoff calls, but the telephone services are not provided with respect to the initial calls since the remaining channels have already been allocated to serve as the reserved channels. As a result, according to the conventional reserved channel determining method, the number of the reserved channels is fixed, and thus it cannot adaptively cope with the fluctuant handoff traffic density changed by various reasons.

Figure 2:
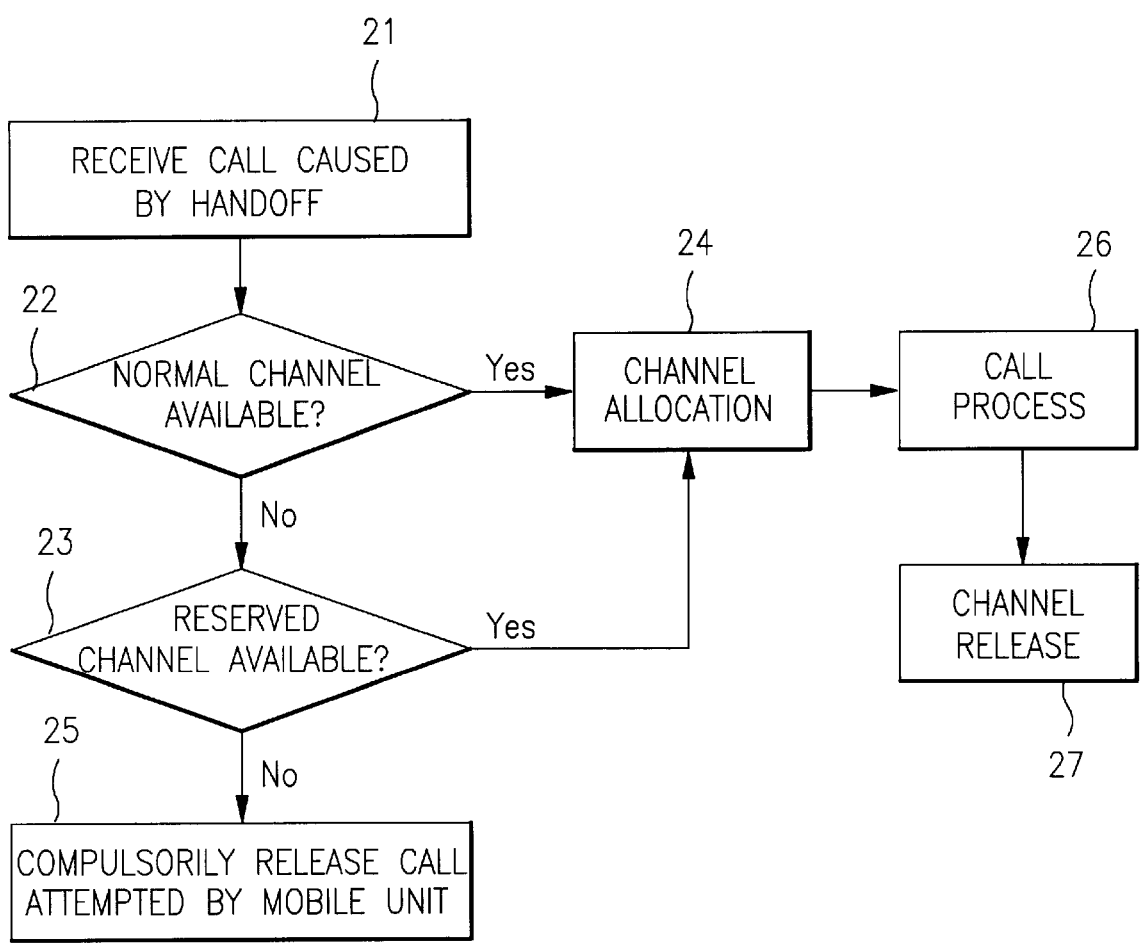
FIG. 2 is a flowchart incorporating a conventional reserved channel allocating method in a mobile radio communication system.

FIG. 2 is a flowchart incorporating a conventional reserved channel allocating method in a mobile radio communication system. Referring to FIG. 2, if a certain mobile unit in use crosses the boundary between two cells to enter an adjacent cell, the handoff is performed. At this time, the corresponding base station of the adjacent cell receives a call caused by the handoff (step 21), and then judges whether any normal channel is available with respect to such a handoff call (step 22). If available as a result of judgment, the base station allocates a channel with respect to the handoff call (step 24), while otherwise, it judges whether any reserved channel is available with respect to the handoff call (step 23). At this time, if available, the base station allocates a channel with respect to the handoff call (step 24), while otherwise, the handoff call from the mobile unit is compulsorily released (step 25). If any normal or reserved channel is allocated at step 24, the corresponding handoff call is processed (step 26), and then the allocated channel is released (step 27).

However, according to the conventional method, the number of the reserved channels for the handoff calls is fixedly set, it is difficult to effectively cope with the handoff traffic density rapidly changed.

For instance, if the number of initial calls is continuously increased in a state that about 20% of the whole channels are allocated for the initial calls and about 50% of the whole channels are allocated for the handoff calls in a particular service area, the telephone services cannot be provided with respect to any further initial call since the remaining 30% of the whole channels have already been allocated as the reserved channels and thus they are not available.

Figure 3:
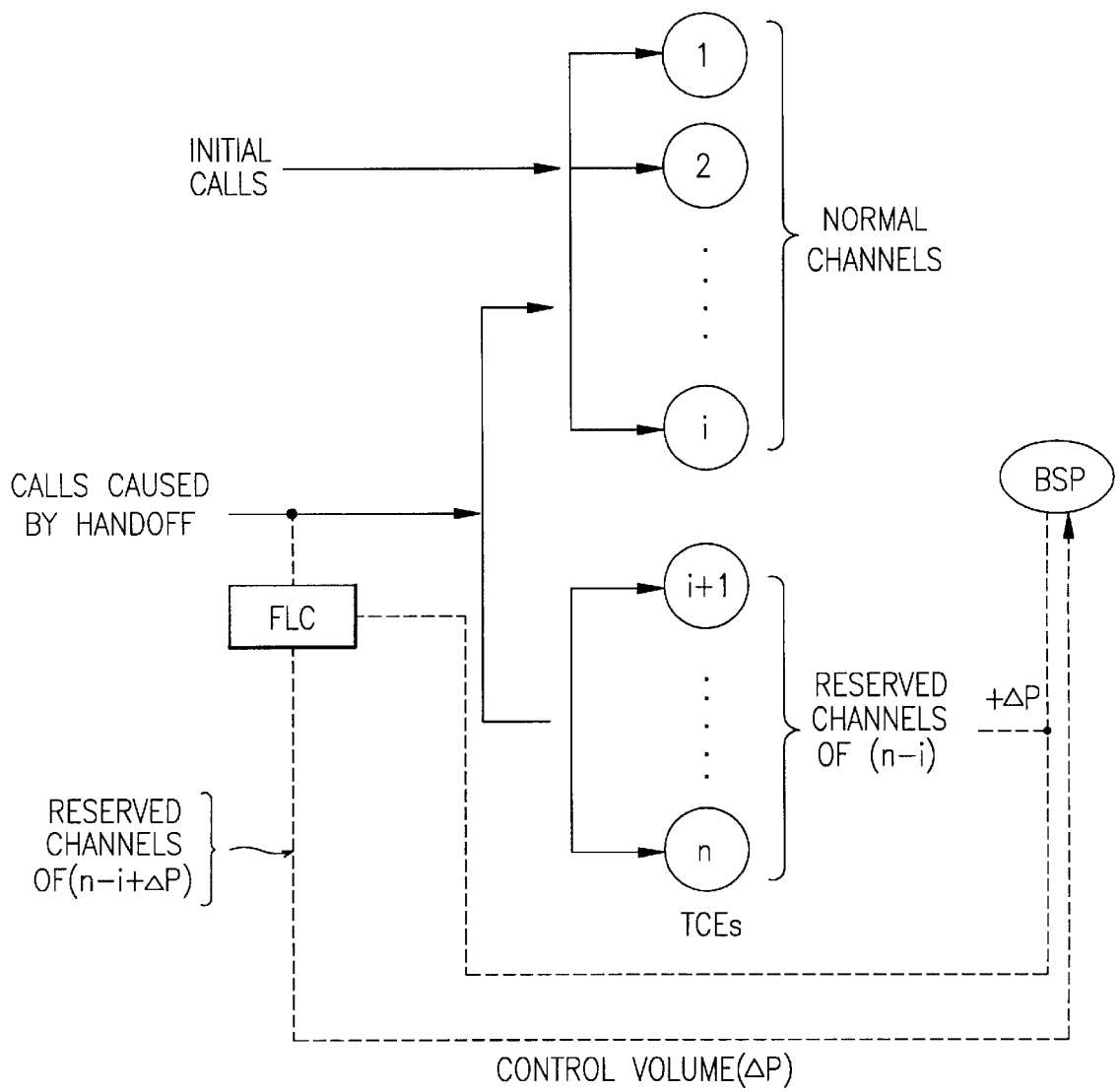
FIG. 3 is a view explaining the reserved channel allocating method in a mobile radio communication system according to the present invention.
Figure 4:
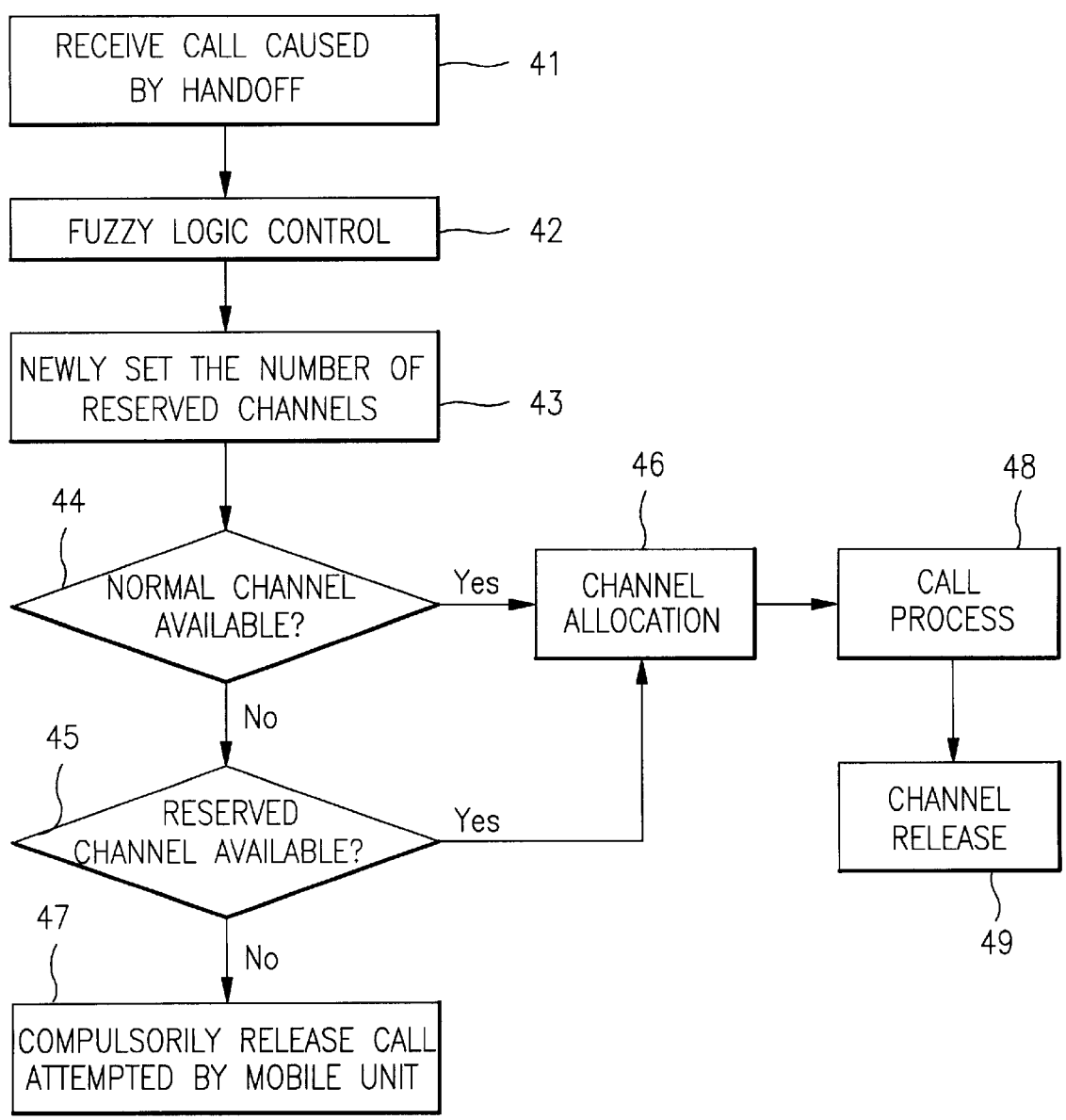
FIG. 4 is a folwchart incorporating the reserved channel allocating method in a mobile radio communication system according to the present invention.
Figure 5:
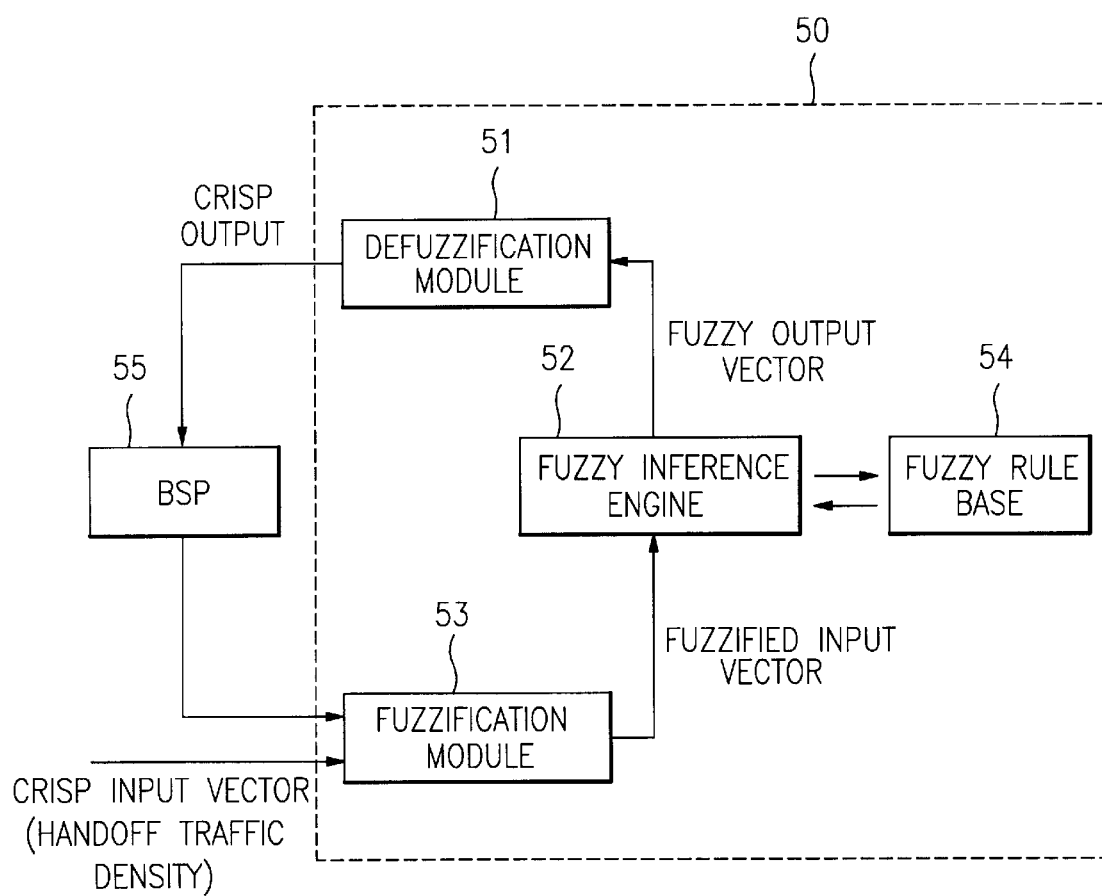
FIG. 5 is a block diagram of a fuzzy logic controller according to the present invention.
Figure 6A:
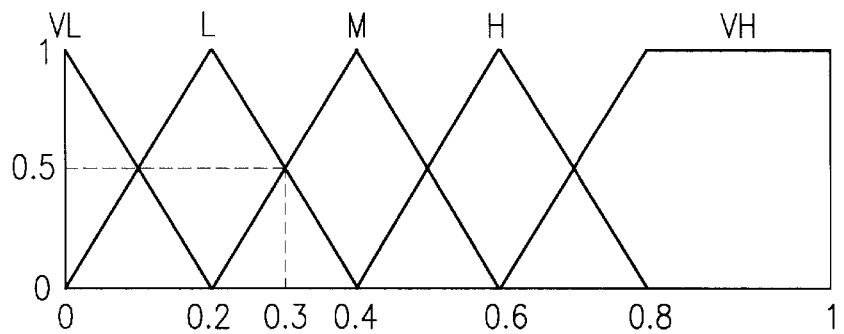
FIGS. 6A and 6C are graphs of membership functions used by the fuzzy logic controller according to the present invention.

FIG. 3 is a view explaining the reserved channel allocating method in a mobile radio communication system according to the present invention, and FIG. 4 is a flowchart incorporating the reserved channel allocating method in a mobile radio communication system according to the present invention. FIG. 5 is a block diagram of a fuzzy logic controller according to the present invention, FIGS. 6A and 6C are graphs of membership functions used by the fuzzy logic controller according to the present invention, and FIG. 7 is a view explaining the fuzzy rule base used by the fuzzy logic controller according to the present invention.

The reserved channel allocating method in a mobile radio communication system according to the present invention will now be explained with reference to FIG. 3.

Referring to FIG. 3, the base station signaling processor (BSP) provided in the base station samples for a predetermined period ($\Delta T$) the number (n−i) of reserved channels determined in a previous period and the number of handoff calls required currently, and provides the sampled numbers to a fuzzy logic controller (FLC). The fuzzy logic controller (FLC) outputs for the predetermined period ($\Delta T$) a controlled number, i.e., a control volume ($\Delta P$) which corresponds to the number of the handoff calls. This control volume ($\Delta P$) defines the number of the reserved channels which should be added to or subtracted from the currently set number of the reserved channels. The base station signaling processor (BSP) controls a plurality of traffic channel elements (TCE) to newly set the number (n−i+$\Delta P$) of the reserved channels which is adjusted in accordance with the control volume ($\Delta P$), and feeds the newly set number of the reserved channels back to the fuzzy logic controller (FLC) for the reserved channel control with respect to the traffic density of the handoff calls which will be sampled for a next period ($\Delta T$). According to this method, the number of reserved channels is adaptively controlled in accordance with the traffic density of the handoff calls, thereby effectively coping with the handoff calls rapidly changed.

FIG. 4 is a flowchart incorporating the reserved channel allocating method in a mobile radio communication system according to the present invention.

Referring to FIG. 4, if a certain mobile unit in use crosses the boundary between two cells to enter an adjacent cell, the handoff is performed. At this time, the corresponding base station of the adjacent cell receives a call caused by the handoff (step 41), and the base station signaling processor (BSP) performs the fuzzy logic control to newly set the number (n−i+$\Delta P$) of reserved channels (step 42) Specifically, the base station signaling processor (BSP) samples for the predetermined period ($\Delta T$) the number (n−i) of reserved channels determined in the previous period and the number of handoff calls, and outputs the control volume ($\Delta P$) corresponding to the number of the handoff calls. Accordingly, the base station signaling processor (BSP) sets the new number (n−i+$\Delta P$) of reserved channels which is obtained by adjusting the current number of reserved channels in proportion to the control volume ($\Delta P$) (step 43). Here, the period for sampling the handoff calls may be adjusted to be in the range of several or several tens of minutes if necessary. The newly set number of reserved channels will be properly readjusted in the next period for sampling the handoff calls by the fuzzy logic controller.

FIG. 5 is a block diagram of a fuzzy logic controller according to the present invention.

Figure 6B:
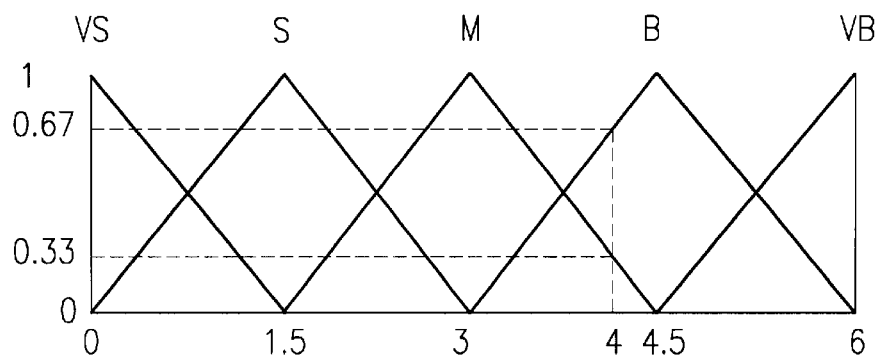
Figure 6C:
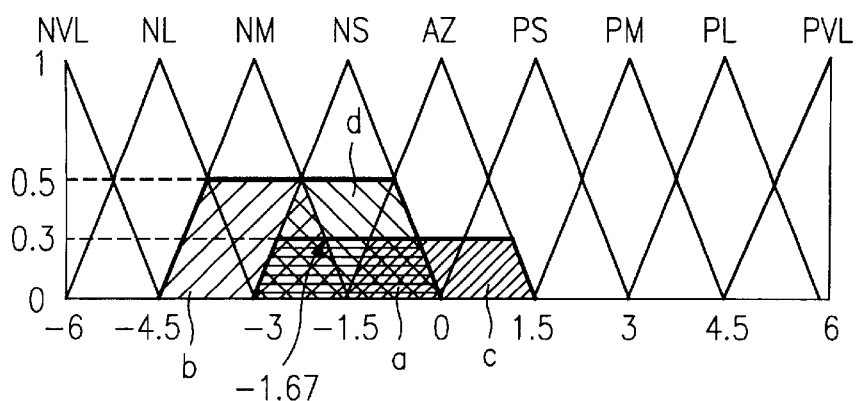

Referring to FIG. 5, a fuzzification module 53 in the fuzzy logic controller 50 receives as its input vectors two crisp values (i.e., the number of traffic channels set in the last period and the traffic density required by the handoff), and converts them into proper linguistic variables in accordance with membership functions as shown in FIGS. 6A and 6B.

FIG. 6A illustrates the membership function with respect to the handoff traffic density. In FIG. 6A, the handoff traffic density is composed of five membership functions. Specifically, the y axis represents the membership grade of the membership function (μ) which generally takes the values between "0" and "1", that is, μ→[0.1]. Here, "1" denotes a full membership, and "0" denotes a null membership. Also, the x axis represents the ratio of the number of handoff calls to the traffic density of initial calls in the range of "0" to "1". The symbols "VL", "L", "M", "H", and "VH" in FIG. 6A denote "very low", "low", "medium", "high", and "very high", respectively.

FIG. 6B illustrates the membership function with respect to the number of reserved channels lastly set. In FIG. 6B, the number of reserved channels is composed of five membership functions. Specifically, the y axis represents the membership grade of the membership function (μ) as in FIG. 6A, and "0" and "1" of the x axis represent the minimum number and the maximum number of reserved channels which can be outputted from the fuzzy logic controller, respectively. Here, the maximum number and the minimum number of the reserved channels can be redefined according to the number of the whole traffic channels. The reference symbols "VS", "S", "M", "B", and "VB" in FIG. 6B denote "very small", "small", "medium", "big", and "very big", respectively.

The fuzzy inference engine 52 of the fuzzy logic controller 50 as shown in FIG. 5 receives the fuzzified input vectors from the fuzzification module 53 as its inputs, and then performs an operation according to the basic fuzzy rule of FIG. 7 utilizing the "IF-THEN" rule, after ANDing, i.e., crossing of the membership functions as shown in FIGS. 6A and 6B with respect to the n fuzzy variables through the approximate reasoning using the minimum operation. The fuzzification module 53 calculates the control volume of reserved channels from the fuzzy output vectors, which is an actually controllable crisp value, in accordance with the membership functions with respect to the tuning of the reserved channels as shown in FIG. 6C utilizing a centroid method.

Referring to FIG. 6C, the tuning of reserved channels is composed of nine membership functions. Specifically, the y axis represents the membership grade of the membership function (μ) as in FIG. 6A, and "−6" and "6" of the x axis represent the lastly set number of reserved channels which can be tuned, that is, the minimum number and the maximum number of tuned channels. The reference symbols "NVL", "NL", "NM", and "NS" represent "negative, very low", "negative, low", "negative, medium", and "negative, small", respectively. Also, the reference symbols "PS", "PM", "PL", and "PVL" represent "positive, small", "positive, medium", "positive, low", and "positive, very low", and "AZ" represents "almost zero".

In the state that the number of reserved channels has been newly set as described above, the base station signaling processor judges whether any normal channel is available with respect to the received handoff call (step 44). If any normal channel is available as a result of judgment, the base station signaling processor allocates a channel with respect to the handoff call (step 46) while otherwise, it judges whether any reserved channel is available with respect to the handoff call (step 45). At this time, if any reserved channel is available, it allocates a channel with respect to the handoff call (step 46), while otherwise, the handoff call from the mobile unit is compulsorily released (step 47). If any normal or reserved channel is allocated at step 46, the corresponding handoff call is processed (step 47), and then the allocated channel is released (step 49).

Hereinafter, the setting of the new number (n−i+ΔP) of reserved channels according to an embodiment of the present invention will be explained with reference to FIGS. 4 to 7.

If the number of reserved channels set in the last period in a certain cell is four, and the traffic density of the handoff calls to the cell is 0.3 (i.e., 30%) of that of the initial calls in the cell, the fuzzified input vectors as in Table 1 below can be obtained by matching the above values with the respective membership functions as shown in FIGS. 6A and 6B.

TABLE 1

| Membership function of handoff traffic density | Membership function of reserved channels |
|---|---|
| $\mu_L(0.3) = 0.5$ | $\mu_M(4) = 0.33$ |
| $\mu_M(0.3) = 0.5$ | $\mu_B(4) = 0.67$ |

Specifically, as shown in FIG. 6A, if the traffic channel density caused by the handoff is 0.3, the membership grades of the membership functions become 0.5 which is a half of the "low(L)" and "medium(M)", respectively. Also, as shown in FIG. 6B, the number of reserved channels set in the last period is four, and thus the membership grade of the membership function is 0.33 in case of "medium(M)", while it is 0.67 in case of "big(B)".

These fuzzy input vector values are then processed by the fuzzy inference engine, and thus four fuzzy output vectors such as $\mu_{NS}$ (reserved channel tuning)≈0.33, $\mu_{NM}$(reserved channel tuning)≈0.5, $\mu_{AZ}$(reserved channel tuning)≈0.33, and $\mu_{NS}$(reserved channel tuning)≈0.5 will be obtained as shown in FIG. 6C.

Specifically, if the handoff traffic density is low(L) (0.5), and the lastly set number of reserved channels is medium (M) (0.33), the lastly set number of reserved channels is tuned to negative small(NS) as shown in FIG. 7. Accordingly, the obtained membership grade will be 0.33 by the minimum approximate reasoning (See the area "a" in FIG. 6C).

If the handoff traffic density is low(L) (0.5), and the lastly set number of reserved channels is big(B) (0. 67), the lastly set number of reserved channels is tuned to negative medium(NM) as shown in FIG. 7. Accordingly, the obtained membership grade will be 0.55 by the minimum approximate reasoning (See the area "b" in FIG. 6C).

If the handoff traffic density is medium(M) (0.5), and the lastly set number of reserved channels is medium(M) (0.33), the lastly set number of reserved channels is tuned to almost zero(AZ) as shown in FIG. 7. Accordingly, the obtained membership grade will be 0.33 by the minimum approximate reasoning (See the area "c" in FIG. 6C).

If the handoff traffic density is medium(M) (0.5), and the lastly set number of reserved channels is big(B) (0.67), the lastly set number of reserved channels is tuned to negative small(NS) as shown in FIG. 7. Accordingly, the obtained membership grade will be 0.5 by the minimum approximate reasoning (See the area "d" in FIG. 6C).

Finally, the fuzzy logic controller 50 outputs the crisp value of −1.67 (i.e., the centroid value of the sum of the areas "a", "b", "c", and "d"as shown in FIG. 6C) by processing four fuzzy output values obtained as above by the centroid method. This value will be used for tuning the lastly set number of reserved channels. Since the number of reserved channels to be set is an integer, the fuzzy logic controller 50 finally outputs "2" by adding the tuned value to the number of the lastly set number of reserved channels, i.e., "4", and then rounding off the resultant value.

As described above, according to the present invention, the allocation of the number of reserved channels is adaptively controlled by using the fuzzy logic controller, the number of reserved channels in accordance with the fluctuant thereby coping with the handoff traffic density rapidly changing in a specified service area. Also, since the given channel resources are effectively employed, the performance and reliability of the base station can be greatly increased.

It will be apparent to those skilled in the art that various modifications and variations can be made in the reserved channel allocating method in a mobile radio communication system of the present invention without departing from the spirit and scope of the invention. Thus, it is intended that the present invention covers the modifications and variations of this invention provided they come within the scope of the appended claims and their equivalents.

What is claimed is:

1. A reserved channel allocating method in a mobile radio communication system comprising:

sampling a handoff traffic density for a predetermined time interval;

sampling the number of reserved channels allocated in a previous time period for the predetermined time interval;

processing the sampled number of the reserved channels and the handoff traffic density by a fuzzy-logic controller; and adjusting the ratio of the number of normal channels to the number of reserved channels according to the result of the processing.

2. The reserved channel allocating method as claimed in claim 1, wherein said ratio is adjusted by controlling the number of reserved channels.

3. The reserved channel allocating method as claimed in claim 2, wherein a maximum number and/or a minimum number of the reserved channels is set according to the whole number of the traffic channels.

4. The reserved channel allocating method as claimed in claim 1, further comprising repeating said sampling a handoff traffic density through adjusting the ratio steps for a next predetermined time interval using the adjusted number of reserved channels.

5. The reserved channel allocating method as claimed in claim 1, wherein the processing step comprises:

inputting the sampled values of the handoff traffic density and the number of the reserved channels as vectors values;

converting the vector values into fuzzy-processed input vector values according to predetermined functions;

performing at least an AND operation of membership functions with respect to the fuzzy-processed vector values through an appropriate reasoning using one of a minimum operation and prescribed operation; and calculating a control volume for the reserved channels using the result value.

6. The reserved channel allocating method as claimed in claim 5, wherein the AND operation is an operation according to a predetermined basic fuzzy rule.

7. The reserved channel allocating method as claimed in claim 5, wherein the predetermined time interval for sampling is freely adjusted as necessary.

8. The reserved channel allocating method as claimed in claim 1, further comprising:

determining whether the adjusted ratio of the number of normal channels to the number of reserved channels is available responsive to a handoff call; and allocating or releasing the handoff call according to the result of the determining.

9. The reserved channel allocating method as claimed in claim 1, wherein the fuzzy-logic controller comprises:

a defuzzification module that generates a crisp output signal using a fuzzy output vector and transmits the crisp output signal to a base station signal processor outside the fuzzy-logic controller;

a fuzzy inference engine that generates the fuzzy output vector using an inputted fuzzified input vector;

a fuzzy rule base coupled to the fuzzy inference engine that provides fuzzy rules to the fuzzy interference engine; and a fuzzification module that generates the fuzzified input vector using a crisp input vector and a previous crisp output from the base station signal processor.

10. A reserved channel allocating method in a mobile radio communication system comprising:

sampling a number of handoff traffic density for a prescribed time interval;

sampling a number of reserved channels allocated in a previous time period for said prescribed time interval;

outputting a control volume for the reserved channels by processing the sampled number of the reserved channels and the sampled number of handoff traffic density through fuzzy-logic-processing; and setting a new number of the reserved channels by the number of the reserved channel according to the control volume, wherein the outputting step comprises, inputting the sampled values of the handoff traffic density and the number of the reserved channels as vectors values, converting the vector values into proper linguistic variable according to membership functions, performing at least an AND operation of the membership functions with respect to the converted vector values through an appropriate reasoning using one of a minimum operation and a prescribed operation, and calculating the control volume for the reserved channels using the operated values.

11. The method of claim 10, wherein the AND operation is an operation according to a prescribed basic fuzzy rule.

* * * * *